US009679266B2

(12) United States Patent
Brown

(10) Patent No.: US 9,679,266 B2
(45) Date of Patent: Jun. 13, 2017

(54) SYSTEMS AND METHODS FOR INTELLIGENT BATCH PROCESSING OF BUSINESS EVENTS

(71) Applicant: Red Hat, Inc., Raleigh, NC (US)

(72) Inventor: Gary Brown, Hertfordshire (GB)

(73) Assignee: RED HAT, INC., Raleigh, NC (US)

( * ) Notice: Subject to any disclaimer, the term of this patent is extended or adjusted under 35 U.S.C. 154(b) by 276 days.

(21) Appl. No.: 14/193,279

(22) Filed: Feb. 28, 2014

(65) Prior Publication Data

US 2015/0248631 A1  Sep. 3, 2015

(51) Int. Cl.
G06F 9/46 (2006.01)
G06Q 10/06 (2012.01)

(52) U.S. Cl.
CPC .............................. G06Q 10/06316 (2013.01)

(58) Field of Classification Search
None
See application file for complete search history.

(56) References Cited

U.S. PATENT DOCUMENTS

| 6,311,144 | B1 | 10/2001 | Abu El Ata |
| 6,640,244 | B1 | 10/2003 | Bowman-Amuah |
| 7,110,959 | B2 | 9/2006 | Hahn-Carlson |
| 7,181,731 | B2 | 2/2007 | Pace et al. |
| 7,814,142 | B2 | 10/2010 | Mamou et al. |
| 8,538,793 | B2 | 9/2013 | Kunti et al. |
| 2004/0237087 | A1* | 11/2004 | Ye .......................... G06F 9/4881 718/101 |
| 2006/0209868 | A1* | 9/2006 | Callaghan .............. G06Q 10/00 370/428 |
| 2011/0231848 | A1* | 9/2011 | Long ....................... G06F 9/546 718/101 |
| 2012/0023369 | A1* | 1/2012 | Bourbonnais ....... G06F 11/1474 714/16 |
| 2012/0272246 | A1* | 10/2012 | Singh ...................... G06F 9/526 718/101 |
| 2014/0330968 | A1* | 11/2014 | Zahoor ............. G06F 17/30539 709/224 |

OTHER PUBLICATIONS

Xu, et al. "Iterative learning control with Smith time delay compensator for batch processes", 2001, Elsevier Science—Journal of Process Control, pp. 321-328.*

(Continued)

Primary Examiner — Kenneth Tang
(74) Attorney, Agent, or Firm — Haynes and Boone, LLP

(57) ABSTRACT

Systems and methods are provided for intelligent batch processing of business events. An exemplary method includes accessing a business process having a plurality of events for execution, determining, using one or more hardware processors, a batch group for processing comprising at least one of the plurality of events, wherein the batch group is determined using a time delay for collecting the at least one of the plurality of events to determine the batch group, and submitting the batch group for processing the at least one of the plurality of events. The method may further include processing the batch group as a first transaction. Processing the first transaction may include determining a resource required by the at least one of the plurality of events and attempting to lock the resource for use during the processing the batch group.

18 Claims, 4 Drawing Sheets

(56) References Cited

OTHER PUBLICATIONS

Barnes et al., "Logging Last Resource Optimization for Distributed Transactions in Oracle WebLogic Server", http://www.oracle.com/technetwork/middleware/weblogic/llr-edbt10-cr-171732.pdf, Mar. 22-26, 2010, 6 pages, Oracle Corporation, Redwood Shores, CA.

Bernstein et al., "Principles of Transaction Processing", http://books.google.co.in/books?id=LmHgK5KKrQQC&lpg=PP1&ots=UNme33jgcA&lr&pg=PA99#v=onepage&q&f=false, [n/a] pp. 31-96, 223-243, [online].

Flint, Tony, "XA and Oracle controlled Distributed Transactions", http://www.oracle.com/technetwork/products/clustering/overview/distributed-transactions-and-xa-163941.pdf, Jun. 2010, pp. 2-28, Oracle Corporation, Redwood Shores, CA.

* cited by examiner

SYSTEMS AND METHODS FOR INTELLIGENT BATCH PROCESSING OF BUSINESS EVENTS

FIELD OF DISCLOSURE

The present disclosure generally relates to batch processing of business events from received business processes, and more particularly to grouping business events into batches to be processed within the scope of a single X/Open Extended Architecture (XA) transaction.

BACKGROUND

X/Open Extended Architecture (XA) provides for distributed transaction processing of a "global transaction." A global transaction is generally a business transaction that requires the use of more than one resource, such as multiple database transactions. XA transactions specify a way that a transaction manager processes the business transaction against multiple resources. In XA, a transaction manager may receive business events for transaction processing (e.g., one or more business processes having business events for execution on resources) and prepare participating network nodes to execute their respective processes (e.g., the business events) of the transaction on their resources. Since XA transactions require the use and synchronization of multiple XA-compliant resources, XA transaction can be expensive on system resources. However, with the exception of simple business processes, business processes may require numerous actions to occur and therefore require the execution of multiple XA transactions.

BRIEF SUMMARY

This disclosure relates to global transaction processing systems and batching business events for transaction processing. Methods, systems, and techniques for intelligent batch processing of business events are provided According to an embodiment, a method for batch processing of received events includes accessing a business process having a plurality of events for execution, determining, using one or more hardware processors, a batch group for processing comprising at least one of the plurality of events, wherein the batch group is determined using a time delay for collecting the at least one of the plurality of events to determine the batch group, and submitting the batch group for processing the at least one of the plurality of events.

According to another embodiment, a system for batch processing of received events includes a non-transitory memory storing batch processing information for a business process and one or more hardware processors in communication with the non-transitory memory and configured to access the business process having a plurality of events for execution, determine a batch group for processing comprising at least one of the plurality of events, wherein the batch group is determined using a time delay for collecting the at least one of the plurality of events to determine the batch group, and submit the batch group for processing the at least one of the plurality of events.

According to another embodiment, a non-transitory computer readable medium comprising a plurality of machine-readable instructions which when executed by one or more processors of a server are adapted to cause the server to perform a method comprising accessing a business process having a plurality of events for execution, determining a batch group for processing comprising at least one of the plurality of events, wherein the batch group is determined using a time delay for collecting the at least one of the plurality of events to determine the batch group, and submitting the batch group for processing the at least one of the plurality of events.

BRIEF DESCRIPTION OF THE DRAWINGS

The accompanying drawings, which form a part of the specification, illustrate embodiments of the invention and together with the description, further serve to explain the principles of the embodiments. It should be appreciated that like reference numerals may be used to identify like elements or similarly functioning elements illustrated in one or more of the figures. The drawing in which an element first appears is generally indicated by the left-most digit in the corresponding reference number.

DETAILED DESCRIPTION

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Figure 1:
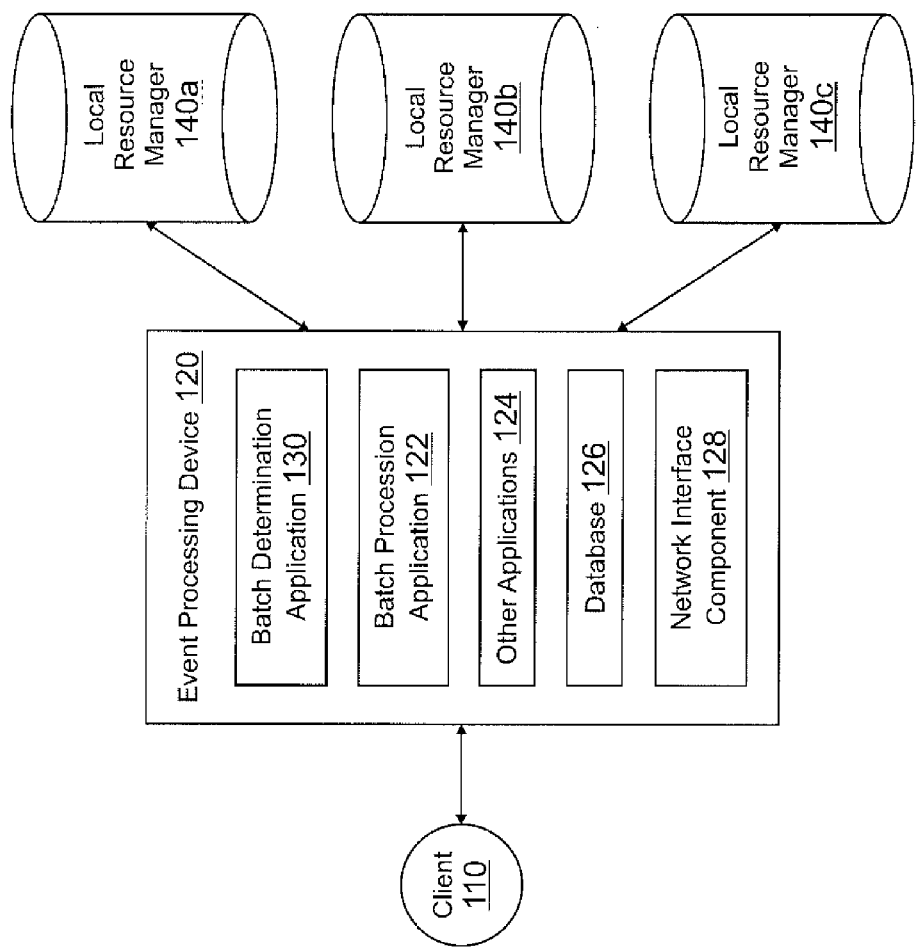
FIG. 1 is a simplified block diagram of an exemplary system for batch processing of business events, according to an embodiment.

FIG. 1 is a simplified block diagram of an exemplary system for batch processing of business events, according to an embodiment. Terms like "machine," "device," "computer," and "computing system" are used interchangeably and synonymously throughout this document. FIG. 1 may include a server computing system or a client computing system.

As shown, FIG. 1 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, an APPLE® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

FIG. 1 includes a client 110, an event processing device 120, and local resource managers 140a, 140b, and 140c. Client 110, event processing device 120 and local resource managers 140*a*, 140*b*, and 140*c* may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of FIG. 1.

In FIG. 1, client 110 may submit business processes having at least one global transaction for processing to event processing device 120, such as a process requiring the use of local resource managers 140*a*, 140*b*, and 140*c*. Event processing device 120 may establish a batch of received business events to process. The size of the batch (e.g., the number of business events to process as a batch) may depend on the current load of event processing device 120 and/or local resource managers 140*a*, 140*b*, and 140*c*. After establishing the batch, event processing device 120 may attempt to lock the resource(s) governed by local resource manager 140*a*, 140*b*, and 140*c* and used in the batch of business events. If the resource(s) cannot be locked, event processing device 120 may place the business event utilizing that resource aside for later processing. Client 110 may be implemented using any appropriate hardware and software configured for wired and/or wireless communication with event processing device 120. For example, in one embodiment, client 110 may be implemented as a personal computer (PC), a smart phone, personal digital assistant (PDA), laptop computer, tablet computer and/or other types of computing devices capable of transmitting and/or receiving data. Although a client is shown, the client may be managed or controlled by any suitable processing device. Although only one client is shown, a plurality of clients may be utilized.

Event processing device 120 may be implemented using any appropriate hardware and software configured for wired and/or wireless communication with client 110 and local resource managers 140*a*, 140*b*, and 140*c*. For example, event processing device 120 may be implemented as a personal computer (PC), a smart phone, personal digital assistant (PDA), laptop computer, tablet computer and/or other types of computing devices capable of transmitting and/or receiving data. Although a transaction manager is shown, the transaction manager may be managed or controlled by any suitable processing device.

Event processing device 120 may utilize one or more applications to process business events through XA transactions using a two-phase commit protocol (2PC) application. In this regard, event processing device 120 contains a batch determination application 130, a batch processing application 122, other applications 124, a database 126, and a network interface component 128. Batch determination application 130, batch processing application 122, and other applications 124 may correspond to processes, procedures, and/or applications executable by a hardware processor, for example, a software program. In other embodiments, event processing device 120 may include additional or different software as required.

Event processing device 120 may be implemented as an application configured to provide global/distributed transaction processing to client 110. Client 110 may transmit business processes having at least one global/distributed transaction to event processing device 120 for processing. Batch determination application 130 may receive and process the business processes by determining the business events of the processes, batching the business events based on system resources, and determining if the business event can operate on locked resources. In this regard, batch determination application 130 monitors the number of business events that are occurring in the received business process instances. Batch determination application 130 may adjust the time delay for collecting the received business events based on the time delay and the number of business processes to be executed by the system.

For example, during a light load on the system (e.g., few incoming business events), batch determination application may utilize a minimal/low time delay so that only a few business events make up a global transaction for processing. Thus, because the system load is light and processing resources are easily available and under light loads, many business transactions can be processed without unduly burdening the system. This improves individual performance of the transactions by quickly processing the transactions having few business events.

However, if there is currently a heavy load on the system and processing resources are of limited availability, the delay may increase to batch more business events in a single transaction. A single transaction requires less system resources for processing, thus, when system resources are under heavy loads, more business events from the received business processes are batched into the single transaction. The longer the delay is for batching business events into a transaction may cause longer delay to processing of the received business processes having those events batched into the transaction.

Thus, batch determination application 130 may gradually increase the delay for batching business events up to a defined maximum delay when the number of business events for processing by the system per second (e.g., the received business processes have a number of business events for processing) is over a predefined threshold. However, when the number of received business events per second is under a minimum threshold, the delay may significantly drop so that the number of business events in a transaction is at a minimum required by the system for the number of business events for processing per second. Once a batch group of business events is collected, a transaction may be started for execution by batching processing application 122.

Batch processing application 122 may determine and start a transaction based on the batch of business events. In order to determine the transaction, batch processing application 122 may determine is resources utilized by the business events batched and for processing can be locked. For example, a database update may correspond to one of the business events. Thus, batch processing application 122 may attempt to lock a resource (e.g., a resource of local resource manager 140*a*, 140*b*, and/or 140*c*) through local resource manager 140*a*, 140*b*, and/or 140*c*. If the resource corresponding to local resource manager 140*a*, 140*b*, and/or 140*c* cannot be locked (e.g., if it is already locked for use in another transaction, is offline, or has failed), then batch processing application 122 determines that the business event corresponding to that resource cannot be processed.

If the resource used by the business event cannot be locked, then the business event may be removed from the batch for processing in a transaction. Additionally, business events that fail to be processed (e.g., a failure of the resource and/or local transaction manager) may also be removed from the batch. Instead, the business event requiring the resource may be added to retry list. All of the business events in the batch that can be processed (i.e., the resource(s) required for the business event can be locked) are then added to the transaction for processing. Batch processing application 122 may determine the transaction as an XA transaction operating on XA-compliant resources. Batch processing application 122 may then create a main coordinator and participants on local resource managers 140a, 140b, and 140c and execute the transaction.

After processing the batch as a first transaction, the retry list of business events that were not processed in the first transaction are then resubmitted for processing as a second transaction. Batch processing application 122 may process the second transaction as an XA transaction. A retry count may be maintained to ensure that indefinite failures of a resource (e.g., failed attempts to lock the resource) cannot occur and the batch can move forward. If the retry count is reached, the business events may be reported to another component, such as an exception management component, that may report the failures to client 110 in order to proceed appropriately.

Event processing device 120 includes other applications 114 as may be desired in particular embodiments to provide features to event processing device 120. For example, other applications 114 may include security applications for implementing security features, programmatic client applications for interfacing with appropriate application programming interfaces (APIs) over, or other types of applications. Other applications 114 may contain software programs, executable by a processor, including a graphical user interface (GUI) configured to provide an interface to a client/user/system administrator.

Event processing device 120 may further include database 116 which may include, for example, X/Open XA information, XA transaction information, XA-compliant resource information, 2PC protocol information, network node information including identifiers, corresponding resources, and/or processing information. Database 116 may include a global/distributed transaction for processing by event processing device 120. Information in database 116 may correspond to received business processes and their corresponding business events. Additionally, database 116 may include transaction participants and their business events for processing. Database 116 may include information on established transaction participants including a commit state of the corresponding established transaction participant and/or an outcome of the transaction participants (e.g., commit or rollback).

In various embodiments, event processing device 120 includes at least one network interface component 118 adapted to communicate with client 110 and local resource managers 140a, 140b, and 140c. In various embodiments, network interface component 118 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Local resource managers 140a, 140b, and 140c may be implemented using any appropriate hardware and software configured for wired and/or wireless communication with event processing device 120. For example, in one embodiment, local resource managers 140a, 140b, and 140c may be implemented as a personal computer (PC), a smart phone, personal digital assistant (PDA), laptop computer, tablet computer and/or other types of computing devices capable of transmitting and/or receiving data. Although a local resource manager is shown, the local resource manager may be managed or controlled by any suitable processing device. Although a plurality of local resource managers are shown, a single local resource manager or more local resource managers may be utilized.

Local resource managers 140a, 140b, and 140c may utilize one or more applications to process a received prepare request having at least one business event of a global transaction for execution by event processing device 120. In this regard, local resource managers 140a, 140b, and 140c include processing applications for executing the business process on a resource corresponding to local resource managers 140a, 140b, and 140c. Local resource managers 140a, 140b, and 140c may include XA transaction compliant processes, procedures, and/or applications executable by a hardware processor, for example, a software program. Local resource managers 140a, 140b, and 140c may respond to the prepare requests by preparing the business event of a transaction (e.g., a business event of an XA transaction) and completing the prepare request up until a commit state. Local resource managers 140a, 140b, and 140c may respond to a commit query with the commit state of local resource manager 140a, 140b, and 140c. Local resource managers 140a, 140b, and 140c may commit the business event to corresponding resources based on a commit command by event processing device 120. Thus local resource managers 140a, 140b, and 140c may utilize a two-phase commit (2PC) protocol to commit or rollback business events on their respective resources. In other embodiments, local resource managers 140a, 140b, and 140c may include additional or different software as required. Resources of local resource managers 140a, 140b, and 140c may correspond to a resource accessible and utilized by event processing device 120 during processing of a transaction. Resources of local resource managers 140a, 140b, and may correspond to a database having data organized and/or stored in data structures that may be searched, altered, and stored.

Figure 2:
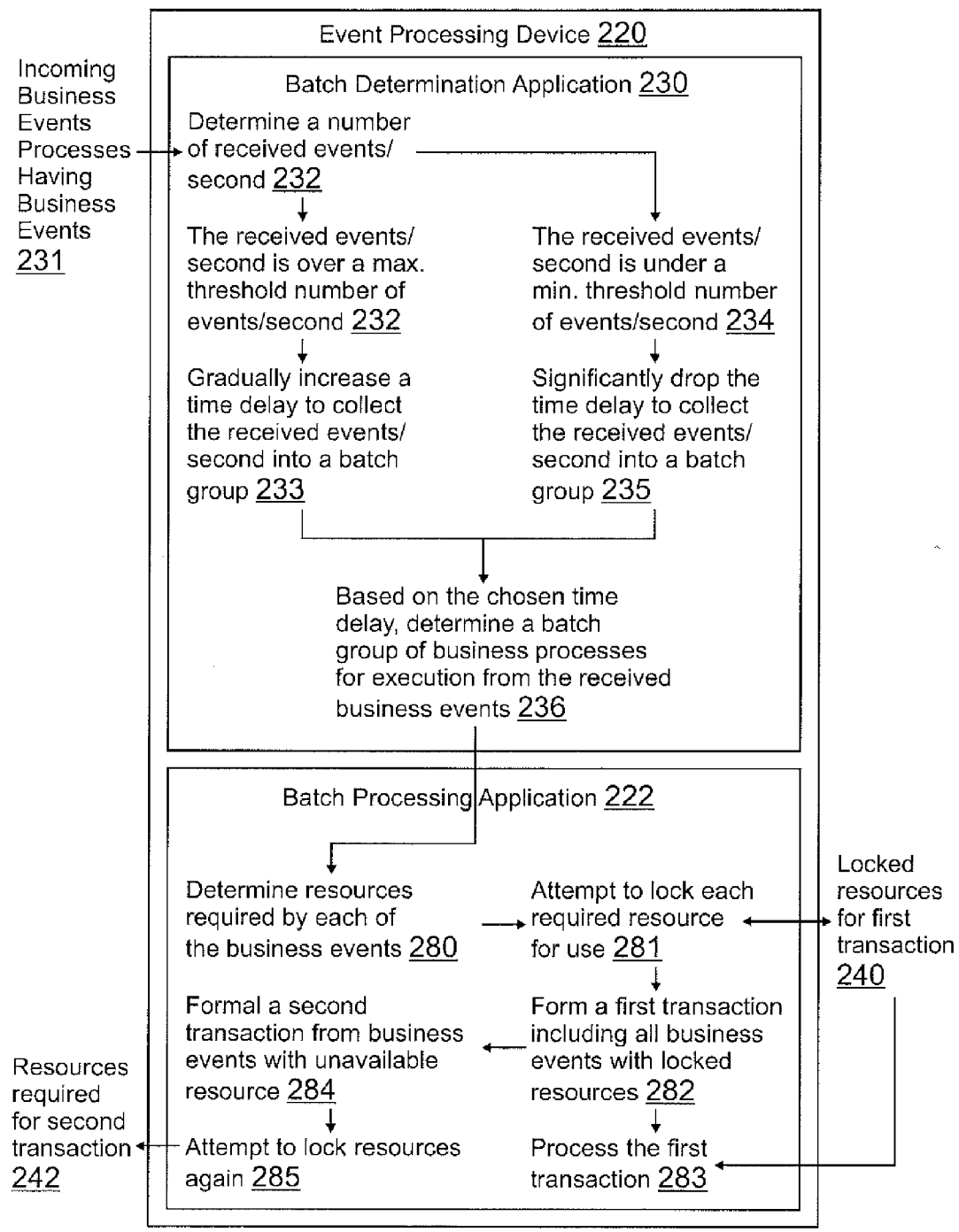
FIG. 2 is an exemplary flowchart of a method for execution by an event processing system for gathering business process into batches and processing the batched business process, according to an embodiment.

FIG. 2 is an exemplary flowchart of a method for execution by an event processing system for gathering business process into batches and processing the batched business process, according to an embodiment. FIG. 2 includes an event processing device 220 corresponding generally to event processing device 120 of FIG. 1. Additionally, event processing device 220 includes a batch determination application 230 and a batch processing application 222 corresponding generally to the described processes and function of batch determination application 130 and batch processing application 122, respectively, of event processing device 120 of FIG. 1.

Event processing device 220 executes batch determination application 220 to process incoming business events. Therefore, at block 231 event processing device 220 receives incoming processes having business events. Batch processing application 230 may determine a number of received events per second at block 232 based on the business processes received at block 231. For example, the received business processes may have at least one business event for execution. Based on the number of business events in the received business processes, batch determination application 230 may determine a number of business events that event processing device 220 is receiving per second. If the business processes contain a large number of business events, the number of business events per second may be determined to be high (e.g., a large load on the system). Alternatively, if event processing device only receives a few, or one, business process, or the number of business events in the business processes are low, the number of received business events per second is low and there is a light load on the system.

Based on the number of received business events per second, batch determination application 230 may determine the delay for collecting business events into a batch. Thus, at block 232, if the number of business events received per second is over a maximum threshold of events, batch determination application may proceed to block 233 where the time delay for collecting the received events per second into a batch group is gradually increased so that more business events are added to a single batch group and less batch groups per the number of business events are processed (i.e., batch groups have a high number of business events to be processed as a batch). The time delay may be gradually increased until a maximum set delay.

Alternatively, if, at block 234, the number of received business events per second is under a minimum threshold of business events per second, batch determination application 230 may proceed to block 235 where the time delay for collecting received business events into a batch group is significantly dropped to a minimum set delay or no delay. Thus, the batch of business events when the business events per second being received are below a minimum threshold may include few business events (or, in certain embodiments, only a single business event). Therefore, if there is a low load on the system, event processing device may process a high number of batches per the received business events. That is, there may be a more batches per the number of received business events as the batches contain less business events per batch than when there is a high load on the system.

At block 236, based on the chosen time delay for collecting business events into a batch, batch determination application 230 may determine a batch group of business events for execution from the received business processes. The batch group may therefore contain a collection of business events from the business processes. Batch determination application 230 may submit the batch group of business events to batch processing application 222 for execution as a transaction.

At block 280, batch processing application 222 determines the resources required by each of the business events in the batch. Thus, if a business event in a batch requires a database resource, batch processing application 222 may determine what the resource is and attempt to contact the resource. Thus, once the required resources are determined by batch processing application 222, at block 281, batch processing application 222 may attempt to lock each resource required for use. Batch processing application 222 may determine if the database is online, if it is accessible (i.e., it is not locked for use in processing another transaction), etc. Batch processing application 222 may utilize a local resource manager to determine the status of the resource(s) required in by the business events in the batch group. Batch processing application 222 may contact locked resources for first transaction 240 and request the local transaction manager to lock the resource for use in processing a first transaction of the batched business events. If the resource and/or local transaction manager fail during processing of the business event, the business event may also be removed from the batch and processed in a next transaction.

At block 282, a first transaction is formed that includes all business events with locked resources. Thus, if the resource required by the business event could be locked for use by the local transaction manager, those business events (or the processes to be executed on the resource) are added to a global transaction to be processed. The global transaction may be an XA transaction that is processed on the resources using the resources local transaction managers and a two-phase commit (2PC) protocol. For the first transaction having locked resources for the first transaction 240, the first transaction is processed by batch processing application 222, at block 283. As previously discussed, a transaction manager having a main coordinator may establish participants on the local transaction managers, where the participants process the business events on the resources for the local transaction manager.

However, in certain embodiments, certain business events of the batch group may have resources that cannot be locked or the resource/local transaction manager fails during processing of the transaction. Thus, the business events having resources that cannot be locked or the business events that fail during processing of the first transaction are added to a retry list to process in a later transaction. At block 284, a second transaction is formed from the business events with unavailable resources. The resources from the second transaction may again attempt to be locked, at block 285. Batch processing application 222 may contact the resources required for the second transaction 242 and attempt to lock them. If the resources can be locked, then the second transaction can be processed as previously discussed (e.g., using an XA transaction with local resource managers). If resources required by certain business events in the retry list (i.e., in the second transaction) cannot be locked, then the business events with resources that cannot be locked may added to another retry list. A limit on the retry count may be maintained to prevent indefinite retries in the event of a complete resource or local transaction manager failure.

Figure 3:
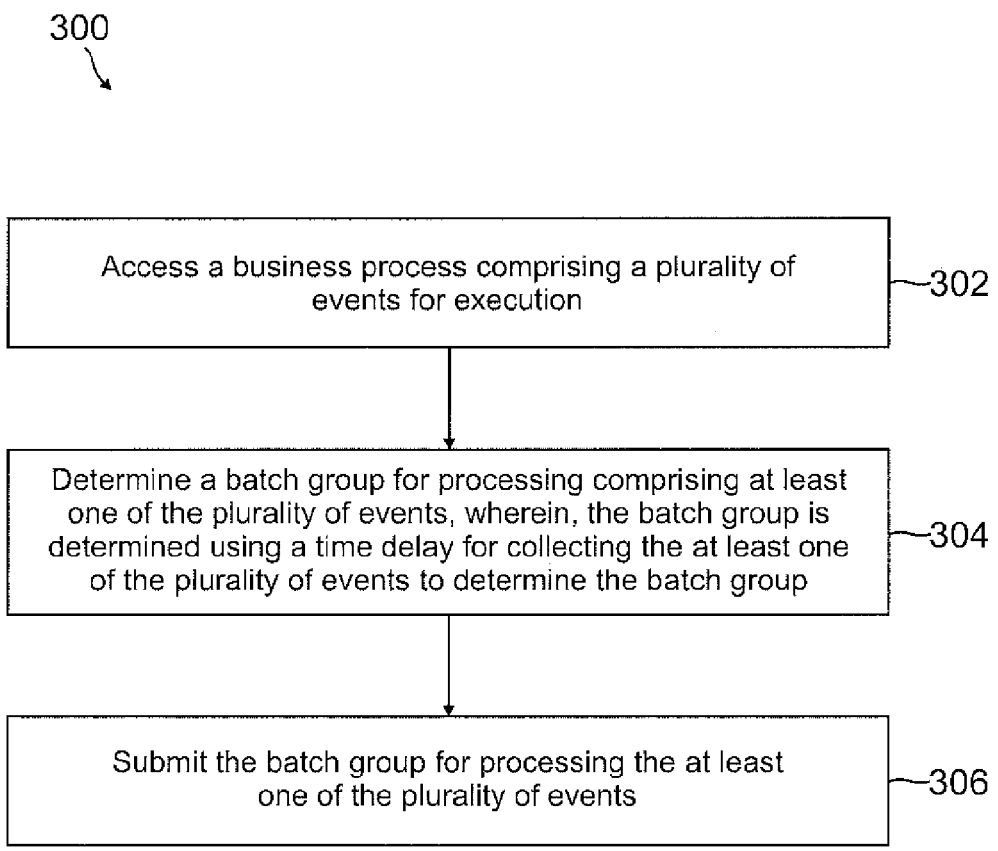
FIG. 3 is an exemplary flowchart illustrating a method for batch processing of business events, according to an embodiment.

FIG. 3 is an exemplary flowchart illustrating a method for batch processing of business events, according to an embodiment. Note that one or more steps, processes, and methods described herein may be omitted, performed in a different sequence, or combined as desired or appropriate.

At step 302, a business process comprising a plurality of events for execution is accessed. The business process may correspond to some process requiring the use of multiple resources. Thus, the business process may correspond to a global transaction for processing.

A batch group for processing may be determined using a time delay for collecting the at least one of the plurality of events to determine the batch group, at step 304, where the batch group comprises at least one of the plurality of events. The time delay may increase to a set maximum time when a number of the plurality of events received per second is over a set threshold of events per second. Additionally, the time delay may decrease when the number of the plurality of events received per second is under a set threshold of events per second.

The batch group may be determined based on a processing load of the system. Once the batch group is determined, the batch group may be submitted for processing the at least one of the plurality of events. The batch group may be processed as a first transaction. When processing the first transaction, a resource required by the at least one of the plurality of events may be determined and the resource may be attempted to lock for use during the processing the batch group. If the resource cannot be locked or the at least one of the plurality of events fails, the at least one of the plurality of events from the batch group may be removed and added to a second transaction. The second transaction may later be processed if the resource can be locked. The first and the second transactions may be processed as XA transactions.

Figure 4:
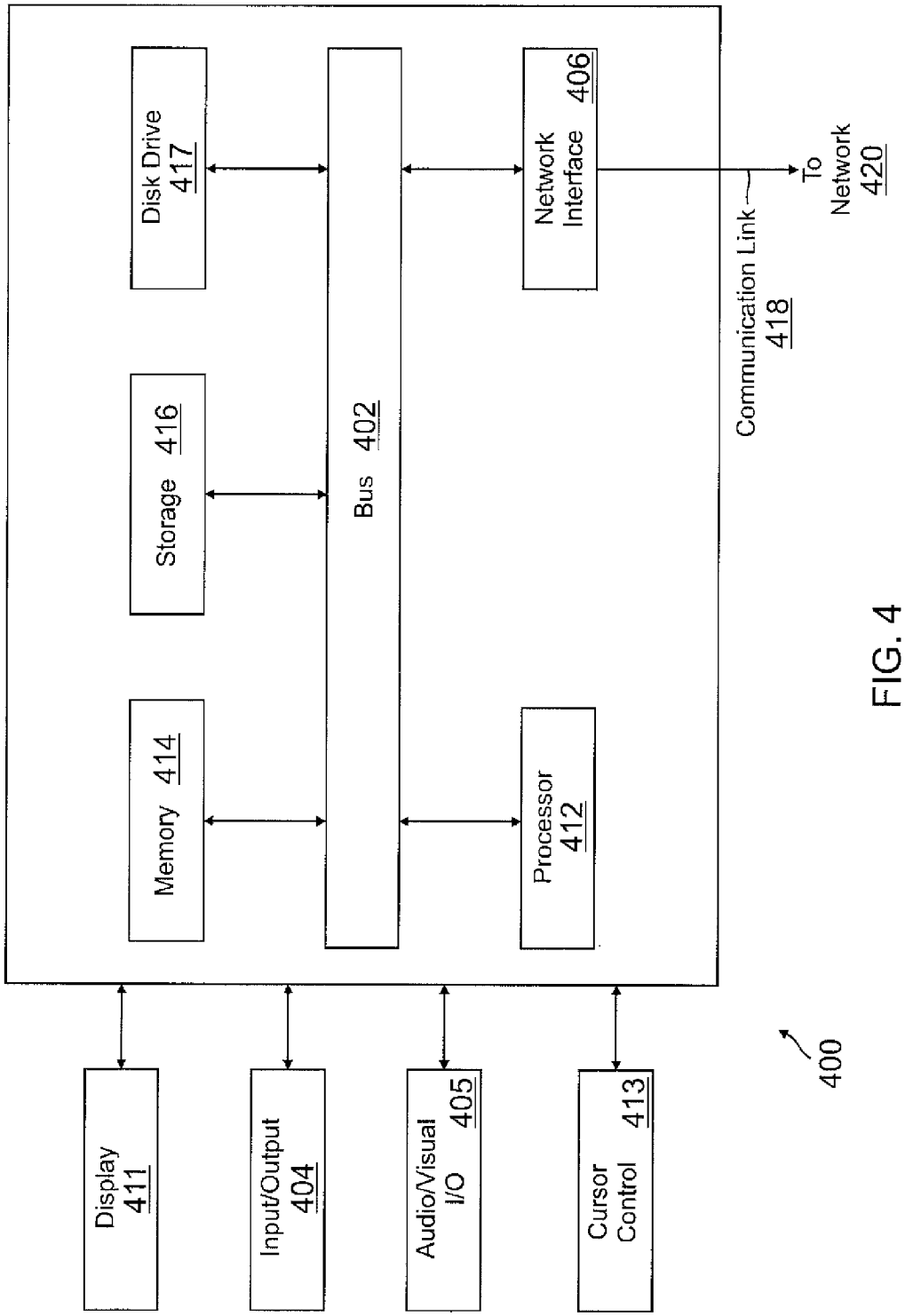
FIG. 4 is a simplified block diagram of a computer system suitable for implementing one or more embodiments of the present disclosure.

FIG. 4 is a block diagram of a computer system 400 suitable for implementing one or more embodiments of the present disclosure. In various embodiments, the endpoint may comprise a personal computing device (e.g., smart phone, a computing tablet, a personal computer, laptop, PDA, Bluetooth device, key FOB, badge, etc.) capable of communicating with the network. The merchant server and/or service provider may utilize a network computing device (e.g., a network server) capable of communicating with the network. It should be appreciated that each of the devices utilized by users and service providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons, image, or links, and/or moving one or more images, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another endpoint via network 420. In one embodiment, the transmission is wireless, although other transmission mediums and methods may also be suitable. One or more processors 412, which can be a micro-controller, digital signal processor (DSP), or other processing component, processes these various signals, such as for display on computer system 400 or transmission to other devices via a communication link 418. Processor(s) 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor(s) 412 and other components by executing one or more sequences of instructions contained in system memory component 414. Logic may be encoded in a computer readable medium, which may refer to any medium that participates in providing instructions to processor(s) 412 for execution. Such a medium may take many forms, including but not limited to, non-volatile media, volatile media, and transmission media. In various embodiments, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method for batch processing of received business events, the method comprising:
   accessing a business process comprising a plurality of events for execution by a system;
   determining a processing load for the system based on available processing resources and incoming processing events;
   determining a time delay for collecting a first number of business events into a batch group based on the processing load of the system and a second number of the plurality of events received per second;
   determining a processing batch size based on the processing load and the time delay;
   determining, using one or more hardware processors, the batch group for processing comprising at least a first event of the plurality of events using the processing batch size and the time delay;
   determining that a second event of the plurality of events is unavailable for processing using a local resource manager for the second event;
   submitting the batch group for processing the at least one of the plurality of events;
   processing the second event in at least a second transaction;
   establishing a retry timer on the second event, wherein the second event is determined to have failed processing if the processing the second event in the at least the second transaction reaches the retry timer; and outputting the failure of the second event when the second event is determined to have failed the processing.

2. The method of claim 1, wherein the time delay increases to a set maximum time when the second number of the plurality of events received per second is over a set threshold of events per second.

3. The method of claim 2, wherein the time delay decreases when the second number of the plurality of events received per second is under the set threshold of events per second.

4. The method of claim 1 further comprising:

processing the batch group as a first transaction.

5. The method of claim 4, wherein prior to processing the batch group, the method further comprises:

determining a resource required by the first event of the plurality of events; and attempting to lock the resource for use during the processing the batch group.

6. The method of claim 5, wherein prior to processing the batch group, the method further comprising:

removing the first event of the plurality of events from the batch group if the resource is not locked for use or the first event fails; and adding the first event removed from the batch group to the second transaction.

7. The method of claim 6 further comprising:

processing the second transaction comprising the first event and the second event.

8. The method of claim 4, wherein the first transaction is an XA transaction.

9. A system for batch processing of received business events, the system comprising:

a non-transitory memory storing batch processing information for a business process; and one or more hardware processors in communication with the non-transitory memory and configured to access the business process comprising a plurality of events for execution by the system;

determine a processing load for the system based on available processing resources and incoming processing events;

determine a time delay for collecting a first number of business events into a batch group based on the processing load of the system and a second number of the plurality of events received per second;

determine a processing batch size based on the processing load and the time delay;

determine the batch group for processing comprising at least a first event of the plurality of events using the processing batch size and the time delay;

determine that a second event of the plurality of events is unavailable for processing using a local resource manager for the second event;

submit the batch group for processing the at least one of the plurality of events;

process the second event in at least a second transaction;

establish a retry timer on the second event, wherein the second event is determined to have failed processing if the processing the second event in the at least the second transaction reaches the retry timer; and output the failure of the second event when the second event is determined to have failed the processing.

10. The system of claim 9, wherein the time delay increases to a set maximum time when the second number of the plurality of events received per second is over a set threshold of events per second.

11. The system of claim 10, wherein the time delay decreases when the second number of the plurality of events received per second is under the set threshold of events per second.

12. The system of claim 9, wherein the one or more hardware processors is further configured to:

determine a resource required by the first event of the plurality of events; and attempt to lock the resource for use during the processing the batch group.

13. The system of claim 12, wherein the one or more hardware processors is further configured to:

process the batch group as a first transaction if the resource is locked.

14. The system of claim 13, wherein the one or more hardware processors is further configured to:

remove the first event of the plurality of events from the batch group if the resource is not locked for use or the first event fails; and add the at least one of the plurality of events removed from the batch group to the second transaction; and process the second transaction.

15. The system of claim 13, wherein the first transaction is an XA transaction.

16. A non-transitory computer readable medium comprising a plurality of machine-readable instructions which when executed by one or more processors of a server are adapted to cause the server to perform a method comprising:

accessing a business process comprising plurality of events for execution by a system;

determining a processing load for the system based on available processing resources and incoming processing events;

determining a time delay for collecting a first number of business events into a batch group based on the processing load of the system and a second number of the plurality of events received per second;

determining a processing batch size based on the processing load and the time delay;

determining the batch group for processing comprising at least a first event of the plurality of events using the processing batch size and the time delay;

determining that a second event of the plurality of events is unavailable for processing using a local resource manager for the second event;

submitting the batch group for processing the at least one of the plurality of events;

processing the second event in at least a second transaction;

establishing a retry timer on the second event, wherein the second event is determined to have failed processing if the processing the second event in the at least the second transaction reaches the retry timer; and outputting the failure of the second event when the second event is determined to have failed the processing.

17. The non-transitory computer readable medium of claim 16, wherein the time delay increases to a set maximum time when the second number of the plurality of events received per second is over a set threshold of events per second, and wherein the time delay decreases when the second number of the plurality of events received per second is under the set threshold of events per second.

18. The non-transitory computer readable medium of claim 17, wherein the method further comprises:

determining a resource required by the first event of the plurality of events;

attempting to lock the resource for use during the processing the batch group; and processing the batch group as a first XA transaction if the resource is locked.

* * * * *